(12) United States Patent
Kang et al.

(10) Patent No.: US 6,647,266 B2
(45) Date of Patent: Nov. 11, 2003

(54) CHANNEL CARD FOR EXTENDING COVERAGE AREA OF BASE STATION

(75) Inventors: Hong Koo Kang, Seoul (KR); Min Young Ahn, Sungnam (KR); Young Jae Cha, Ichon (KR)

(73) Assignee: Hyundai Electronics Ind. Co., Ltd. (KR)

( * ) Notice: Subject to any disclaimer, the term of this patent is extended or adjusted under 35 U.S.C. 154(b) by 451 days.

(21) Appl. No.: 09/788,758

(22) Filed: Feb. 20, 2001

(65) Prior Publication Data

US 2001/0016498 A1 Aug. 23, 2001

(30) Foreign Application Priority Data

Feb. 22, 2000 (KR) .......................................... 2000-8437

(51) Int. Cl.[7] .............................. H04Q 7/20; H04Q 7/30
(52) U.S. Cl. ...................... 455/453; 455/561; 455/434; 455/550.1; 455/11.1; 455/15; 370/328; 370/503; 370/350; 342/357.09; 342/357.1
(58) Field of Search ................................. 455/453, 561, 455/562, 434, 403.1, 422.1, 517, 550.1, 500, 502, 456.5, 11.1, 15; 370/328, 503, 350; 342/357.12, 357.09, 357.08, 357.1

(56) References Cited

U.S. PATENT DOCUMENTS

| | | | |
|---|---|---|---|
| 5,077,759 A | 12/1991 | Nakahara | 345/107 |
| 5,459,728 A | 10/1995 | Yoshioka et al. | 370/95.3 |
| 5,544,171 A | 8/1996 | Gödecker | 370/95.3 |
| 6,421,330 B1 * | 7/2002 | Chung et al. | 455/561 |
| 6,483,817 B1 * | 11/2002 | Antonio et al. | 455/434 |
| 2002/0054611 A1 * | 5/2002 | Seta | 455/561 |

* cited by examiner

Primary Examiner—William Trost
Assistant Examiner—Keith Ferguson
(74) Attorney, Agent, or Firm—Baker Botts LLP

(57) ABSTRACT

There is provided a channel card for extending the coverage area of a base station, which controls GPS reference signals provided to base station modems to extend the coverage area by up to four times a general base station coverage area. The channel card includes: a controller for generating control signals for extending the coverage area of the base station; a system clock distributor for dividing a GPS reference signal applied from a GPS clock receiver to generate a plurality of system clocks; a coverage area extending clock generator for converting the GPS reference signal supplied from the GPS clock receiver into a plurality of signals under the control of the controller, to generate clocks for extending the coverage area; a coverage area extending clock controller for selectively providing the plurality of coverage area extending clocks generated by the coverage area extending clock generator to first to fourth base station modems under the control of the controller; and the first to fourth base station modems which operate according to the coverage area controlling clocks provided by the extension clock controller and the system clocks generated by the system clock distributor, to handle calls established in a first area having the minimum coverage area to a fourth area having the maximum coverage area.

8 Claims, 5 Drawing Sheets

CHANNEL CARD FOR EXTENDING COVERAGE AREA OF BASE STATION

BACKGROUND OF THE INVENTION

1. Field of the Invention

The present invention relates to a channel card for extending the coverage area of a base station. Specifically, the invention relates to a channel card for extending the coverage area of a base station, which controls global positioning system (GPS) reference signals provided to base station modems to extend the coverage area by up to four times a general base station coverage area.

2. Description of the Related Art

The base station of a mobile communication system such as a digital cellular system (DCS) and personal communication system (PCS) generally includes a channel card handling actual calls. This channel card determines the coverage area of the base station on the basis of the modem of the base station. FIG. 1 shows a conventional base station channel card.

Referring to FIG. 1, a high level data link control (HDLC) unit 1 transmits/receives data to/from a control station, and a CPU 2 controls the entire operation of the base station system. A memory 3 is connected to the HDLC unit 1 and a controller 5 to store control data and generation data. A GPS clock receiver 4 receives clocks sent from a GPS and transmits it to a base station modem 6 which will be described below. The controller 5 is connected to the CPU 2, HDLC unit 1, memory 3 and base station modem 6 to control all devices of the channel card under the control of the CPU 2. The base station modem 6 taking charge of calls is controlled by the controller 5 and operates by a reference clock transmitted from the GPS clock receiver 4. A data receiver 10 receives data sent from a mobile through an intermediate frequency (IF) demodulator and transmits the data to the base station modem 6. Further, a serial-parallel converter 7 converts serial data which has passed through the base station modem 6 and controller 5 into parallel data. This parallel data is converted into analog data by a D/A converter 8. A data transmitter 9 delivers this analog data to an IF modulator to transmit it to the mobile.

The conventional channel card constructed as above is used for a general base station to cover only regions having the radius of 60 Km. Accordingly, a base station whose coverage area is extended to 120 Km, 180 Km or 240 Km that is twice, three times or four times the 60 Km has to develop and employ a new channel card for extension of its coverage area. That is, the channel card used for the general base station cannot be used for the base station whose coverage area is extended. This requires development of a new channel card for extension of the coverage area. Furthermore, base stations having different coverage areas need different channel cards suitable for their coverage areas, resulting in increase in development costs.

SUMMARY OF THE INVENTION

It is, therefore, an object of the present invention to provide a channel card for extending the coverage area of a base station, which controls GPS reference signals provided to the modem of the base station to extend the coverage area of the base station by up to four times a general coverage area, being capable of being commonly used for base stations having extended coverage areas as well as the general base station.

To accomplish the object of the present invention, there is provided a channel card for extending the coverage area of a base station, which includes: a controller for generating control signals for extending the coverage area of the base station;

a system clock distributor for dividing a GPS reference signal applied from a GPS clock receiver to generate a plurality of system clocks; a coverage area extending clock generator for converting the GPS reference signal supplied from the GPS clock receiver into a plurality of signals under the control of the controller, to generate clocks for extending the coverage area; a coverage area extending clock controller for selectively providing the plurality of coverage area extending clocks generated by the coverage area extending clock generator to first to fourth base station modems under the control of the controller; and the first to fourth base station modems which operate according to the coverage area controlling clocks provided by the extending clock controller and the system clocks generated by the system clock distributor, to handle calls established in a first area having the minimum coverage area to a fourth area having the maximum coverage area.

DETAILED DESCRIPTION OF THE PREFERRED EMBODIMENT

Reference will now be made in detail to the preferred embodiments of the present invention, examples of which are illustrated in the accompanying drawings.

Figure 1:
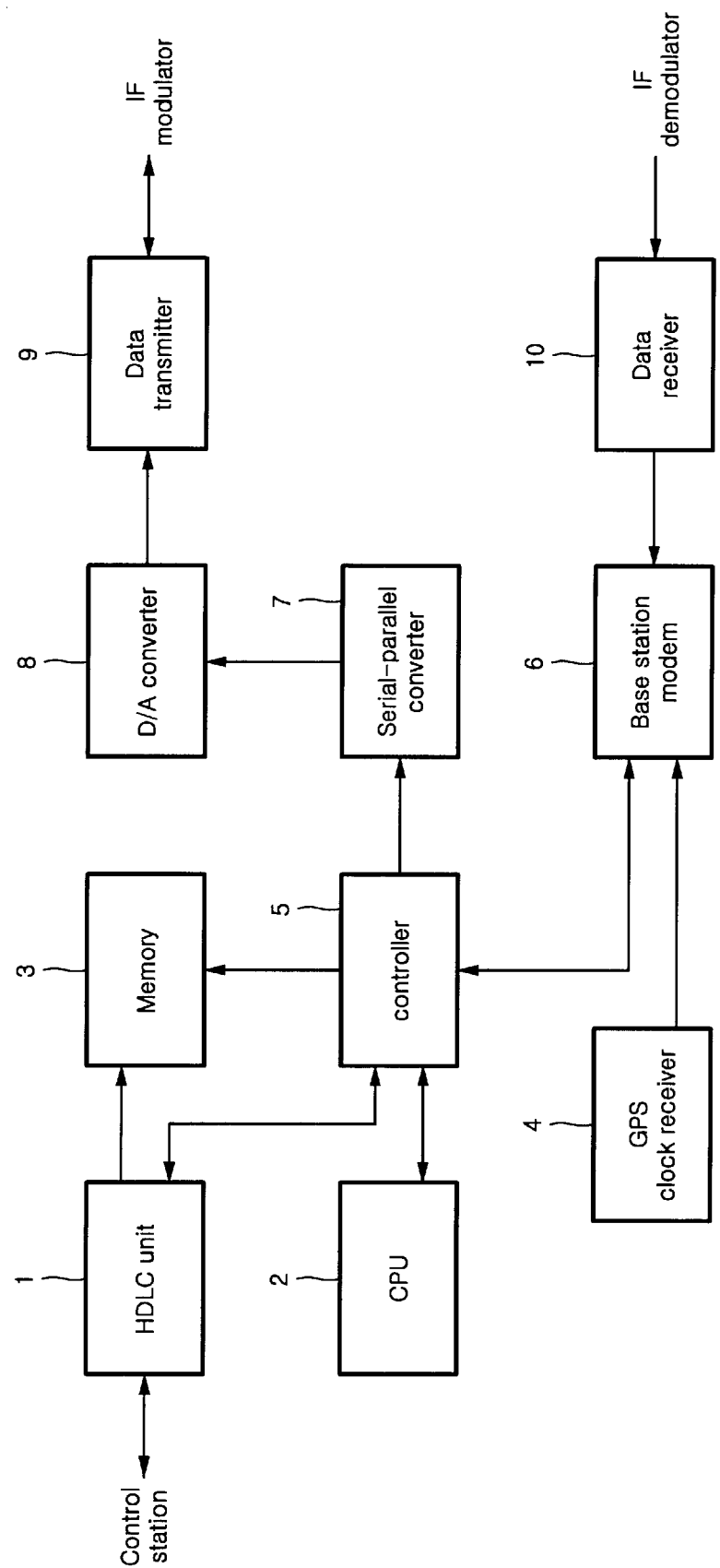
FIG. 1 shows the configuration of a conventional base station channel card.
Figure 2:
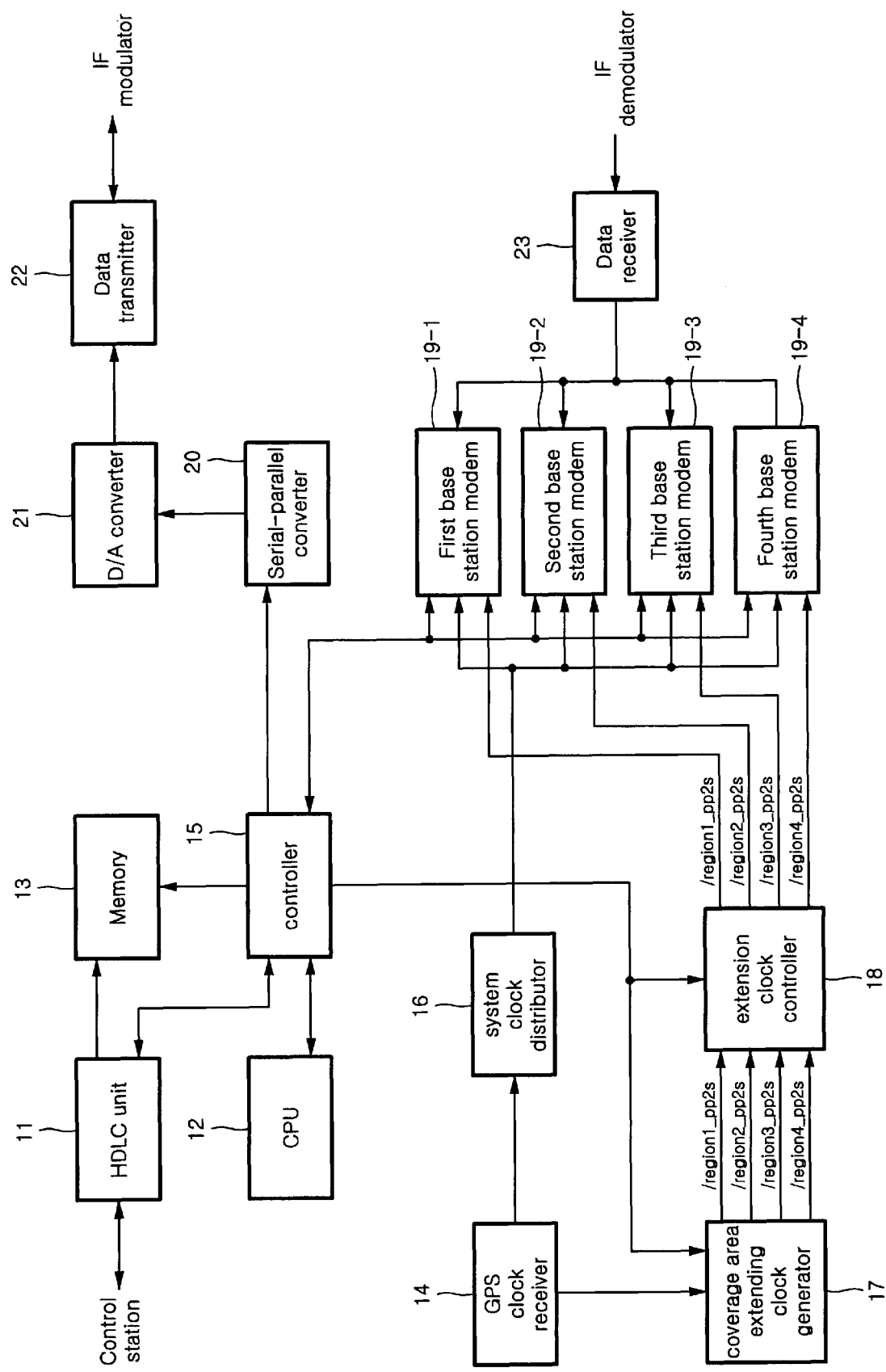
FIG. 2 shows the configuration of a channel card for extension of base station coverage area according to the present invention.

FIG. 2 shows the configuration of a channel card for extension of base station coverage area according to the present invention. Referring to FIG. 2, the channel card of the present invention includes an HDLC unit 11 for transmitting/receiving data to/from a control station, a CPU 12, a memory 13 for storing control data and generation data, a GPS clock receiver 14 for receiving clocks sent from a GPS, a controller 5 for controlling all devices constructing the channel card, and a system clock distributor 16 for dividing a GPS reference signal provided by the GPS clock receiver 14 to output the divided ones as a plurality of system clocks. The channel card also has a unit 17 for generating clocks for extending the coverage area of a base station, which converts the GPS reference signal supplied from the GPS clock receiver 14 into multiple signals to generate a plurality of clocks/region1_$p2s$, /region2_$pp2s$, /region3_$pp2s$ and /region4_$pp2s$ for extending the base station coverage area under the control of the controller 5, and a unit 18 for controlling the clocks for extension of the coverage area, which selectively provides the plurality of coverage area extending clocks generated by the coverage area extending clock generator 17 to a plurality of base station modems 19-1≈19-4 under the control of the controller 5. In addition, the channel card further includes first to fourth base station modems 19-1≈19-4 which operate according to coverage area controlling clocks generated by the extension clock generator 18 and the system clocks outputted from the system clock distributor 16 to handle calls established in a region 1 having the coverage area of 60 Km up to a region 4 having the coverage of 240 Km, a serial-parallel converter 20 for converting serial data outputted from the first to fourth base station modems 19-1≈19-4 into parallel data, a D/A converter 21 for converting the parallel data into analog data, a data transmitter 22 for transmitting the analog data to an IF modulator, and a data receiver 23 for receiving data sent from an IF demodulator to deliver it to the first to fourth base station modems 19-1≈19-4.

Figure 3:
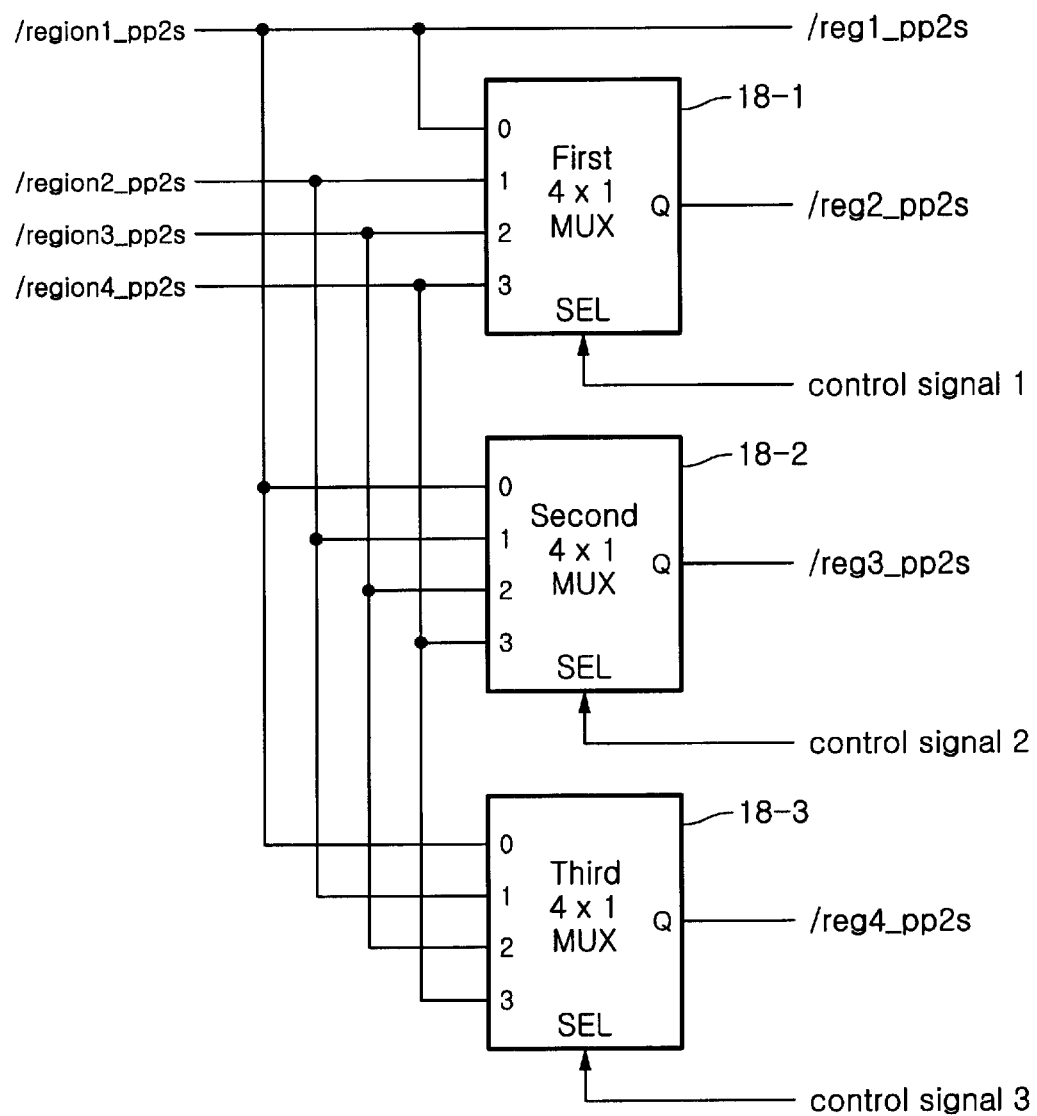
FIG. 3 shows an embodiment of an extension clock controller of FIG. 2.

FIG. 3 shows the extension clock generator 18 of FIG. 2 in detail. Referring to FIG. 3, the extension clock generator 18 includes a first 4×1 MUX 18-1 for selecting one of the four coverage area extending clocks /region1_pp2s, /region2_pp2s, /region3_pp2s and /region4_pp2s generated by the coverage area extending clock generator 17 according to a first control signal provided by the controller 15 to send it to the second base station modem 19-2 as a coverage area controlling clock /reg2_pp2s, a second 4×1 MUX 18-2 for selecting one of the four coverage area extending clocks /region1_pp2s, /region2_pp2s, /region3_pp2s and /region4_pp2s generated by the coverage area extending clock generator 17 according to a second control signal provided by the controller 5 to send it to the third base station modem 19-3 as a coverage area controlling clock /reg3_pp2s, and a third 4×1 MUX 18-3 for selecting one of the four coverage area extending clocks /region1_pp2s, /region2_pp2s, /region3_pp2s and /region4_pp2s generated by the coverage area extending clock generator 17 according to a third control signal provided by the controller 5 to send it to the fourth base station modem 19-4 as a coverage area controlling clock /reg4_pp2s.

In addition, the extension clock generator 18 provides the first coverage area extending clock /region1_pp2s among the fourth extending clocks /region1-pp2s, /region2_pp2s, /region3_pp2s and /region4_pp2s generated by the coverage area extending clock generator 17 to the first base station modem 19-2 as a coverage area controlling clock /reg1_pp2s.

Figure 4:
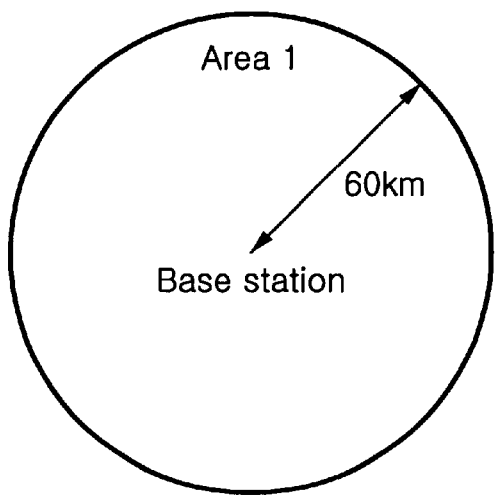
FIG. 4 shows the coverage area of a general base station that can be realized using the channel card of the present invention.
Figure 5:
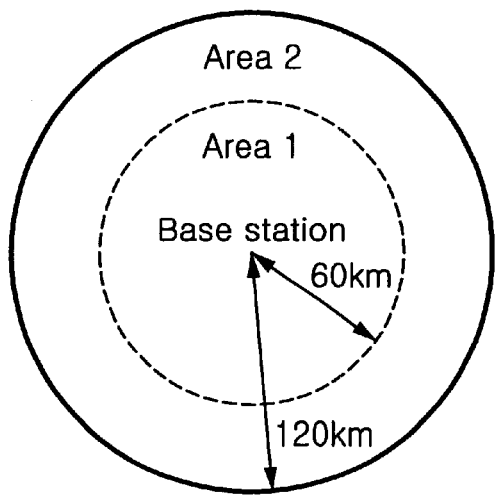
FIGS. 5 and 6 show the coverage areas of base stations for extending their coverage areas which can be realized using the channel card of the present invention.
Figure 6:
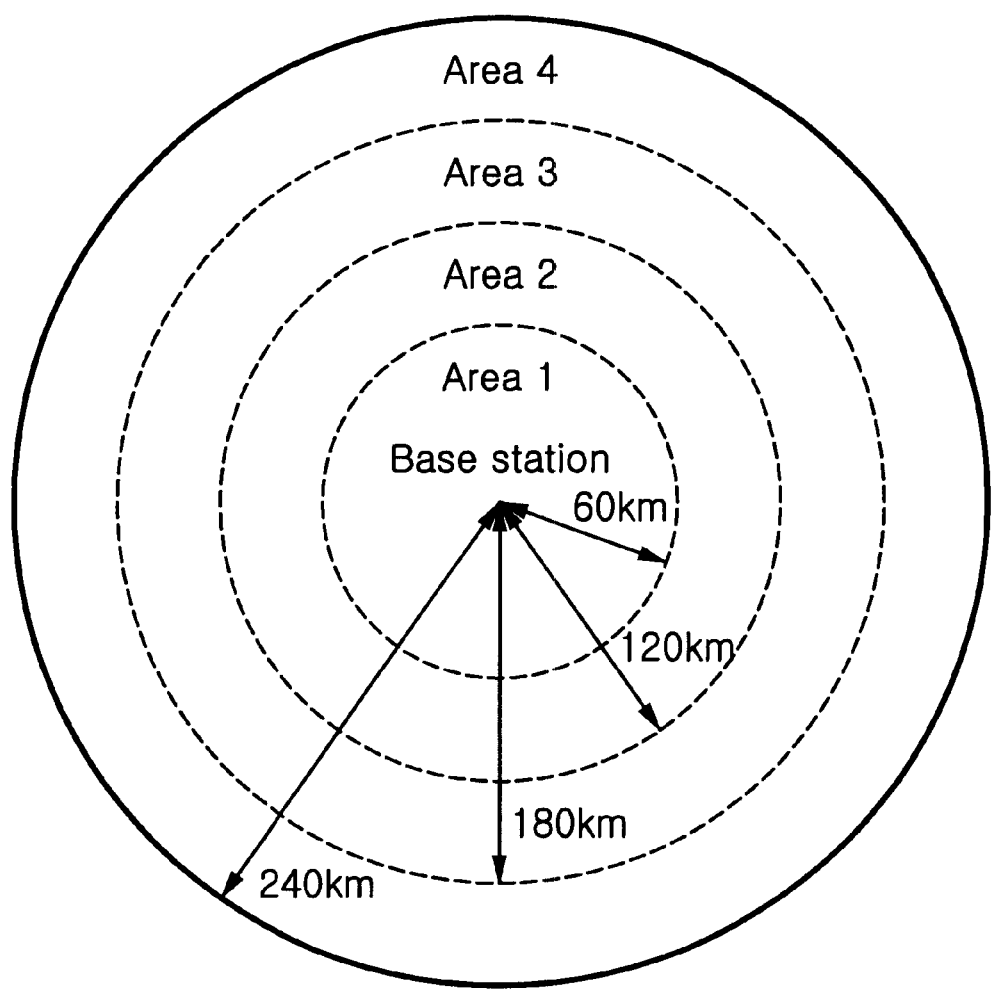

FIG. 4 shows the coverage area of a general base station that can be realized using the channel card of the present invention. As shown in FIG. 4, the channel card of the invention can cover the coverage area of 60 Km. FIGS. 5 and 6 show the coverage areas of base stations for extending their coverage areas, which can be realized using the channel card of the present invention. In this case, the channel card of the invention can cover areas extended to 120 Km and 240 Km.

There will be explained below the operation of the channel card for extending the base station coverage area constructed as above.

First of all, when data is transmitted to a mobile, the HDLC unit 11 receives data from a control station and generates an interrupt to the CPU 12 through the controller 15. The CPU 12 analyzes the data inputted from the HDLC unit 11 and sends it to the first to fourth base station modems 19-1≈19-4. The first to fourth modems 19-1≈19-4 modulate the data received from the CPU 12 according to the system clocks provided by the system clock distributor 16 to send it to the serial-parallel converter 20. Then, the serial-parallel converter 20 converts the data sent from the modems 19-1≈19-4 into parallel data to transmit it to the D/A converter 21 which converts the parallel data into analog data to deliver it to the data transmitter 22. The data transmitter 22 sends the analog data to the IF modulator to transmit it to the mobile.

When the channel card receives data from the mobile, upon reception of digital data from the IF demodulator, the first to fourth base station modems 19-1≈19-4 accept this data, demodulate it and generate an interrupt to the CPU 12 through the controller 15. Then, CPU 12 reads the data demodulated by the modems 19-1≈19-4 and converts it to meet the HDCL mode and transmits it to the control station through the HDLC unit 11.

Next, there is described the operation of the channel card in case of extension of the coverage area. The coverage area extending clock generator 17 converts the GPS reference signal provided by the GPS clock receiver 14 through its inner clock generator to generate four coverage area extending clocks. Specifically, the coverage area extending clock generator generates a first clock /region1_pp2s used for a general base station having the coverage area of 60 Km, and second, third and fourth clocks /region2_pp2s, /region 3_pp2s and /region4_pp2s used for extending the coverage area to 120 Km, 180 Km and 240 Km, respectively, and applies them to the extension clock controller 18.

In case of realization of the general base station having the coverage area of 60 Km, the extension clock controller 18 controls the first clock /region1_pp2s among the four clocks sent from the coverage area extending clock generator 17 to be sent to the first base station modem 19-1. Specifically, the extending clock controller 18 directly transmits the first clock /region1_pp2s among the four clocks /region1_pp2, /region2_pp2s, /region 3_pp2s and /region4_pp2s as the first coverage area controlling clock /reg_pp2s to the first modem 19-1. The first, second and third 4×1 MUXs 18-1, 18-2 and 18-3 select the first clock /region1_pp2s from the four clocks according to first, second and third control signals of '0' provided by the controller 15 to apply the selected first clock as second, third and fourth coverage area controlling clocks reg2_pp2s, reg3_pp2s and reg4_pp2s to the second, third and fourth modems 19-2, 19-3 and 19-4, respectively, thereby sending a first GPS reference signal for covering the coverage area of 60 Km to all of the base station modems.

In case of realization of the base station having the coverage area extended to 120 Km, as show in FIG. 5, the extension clock controller 18 controls the first clock /region1_pp2s among the four clocks /region1_pp2, /region2_pp2s, /region 3_pp2s and /region4_pp2s generated by the coverage area extending clock generator 17 to be applied to the first and second base station modems 19-1 and 19-2 and controls the second extending clock /region2_pp2s to be supplied to the third and fourth modems 19-3 and 19-4. Specifically, the extension clock controller 18 directly supplies the first clock /region1_pp2s among the four clocks /region1_pp2, /region2_pp2s, /region 3_pp2s and /region4_pp2s to the first modem 19-1 as the first coverage area controlling clock /reg1_pp2s. The first 4×1 MUX 18-1 selects the first clock /region1_pp2s from the four clocks according to the first control signal of '0' provided by the controller 15 to apply it as the second coverage area controlling clocks reg2_pp2s to the second modems 19-2. The second and third 4×1 MUXs 18-2 and 18-3 select the second coverage area extending clock /region2_pp2s from the four clocks according to second and third control signals of '1' provided by the controller 15 to apply it as third and fourth coverage area controlling clocks reg3_*pp2s* and reg4_*pp2s* to the third and fourth modems 19-3 and 19-4, respectively, thereby sending the first GPS reference signal for covering the coverage area of 60 Km to the first and second base station modems 19-1 and 19-2 and applying a second GPS reference signal for covering the coverage area of 120 Km to the third and fourth modems 19-3 and 19-4.

In case of realization of the base station having the coverage area extended to 180 Km, as show in FIG. 6, the extension clock controller 18 controls the first clock /region1_*pp2s* among the four clocks /region1_*pp2*, /region2_*pp2s*, /region 3_*pp2s* and /region4_*pp2s* generated by the coverage area extending clock generator 17 to be applied to the first and second base station modems 19-1 and 19-2, controls the second extending clock /region2_*pp2s* to be supplied to the third modem 19-3, and controls the third clock /region3_*pp2s* to be applied to the fourth modem 19-4. Specifically, the extension clock controller 18 directly supplies the first clock /region1_*pp2s* among the four clocks /region1_*pp2*, /region2_*pp2s*, /region 3_*pp2s* and /region4_*pp2s* to the first modem 19-1 as the first coverage area controlling clock /reg1_*pp2s*, and the first 4×1 MUX 18-1 selects the first clock /region1_*pp2s* from the four clocks according to the first control signal of '0' provided by the controller 15 to apply it as the second coverage area controlling clocks reg2_*pp2s* to the second modems 19-2. The second 4×1 MUX 18-2 selects the second coverage area extending clock /region2_*pp2s* from the four clocks according to the second control signal of '1' provided by the controller 15 to apply it as the third coverage area controlling clocks reg3_*pp2s* to the third modem 19-3, and the third 4×1 MUX 18-3 selects the third coverage area extending clock /region3_*pp2s* from the four clocks according to the third control signal of '2' provided by the controller 15 to apply it as the fourth coverage area controlling clocks reg4_*pp2s* to the fourth modem 19-4. By doing so, first GPS reference signal for covering the coverage area of 60 Km is transmitted to the first and second base station modems 19-1 and 19-2, the second GPS reference signal for covering the coverage area of 120 Km is sent to the third modem 19-3, and a third GPS reference signal for covering the coverage area of 180 Km is applied to the fourth modem 19-4.

In case of realization of the base station having the coverage area extended to 240 Km, as show in FIG. 6, the extension clock controller 18 controls the four clocks /region1_*pp2*, /region2_*pp2s*, /region 3_*pp2s* and /region4_*pp2s* generated by the coverage area extending clock generator 17 to be applied to the first to fourth base station modems 19-1 to 19-4, respectively. Specifically, the extension clock controller 18 directly supplies the first clock /region1_*pp2s* among the four clocks /region1_*pp2*, /region2_*pp2s*, /region 3_*pp2s* and /region4_*pp2s* to the first modem 19-1 as the first coverage area controlling clock /reg1_*pp2s*, and the first 4×1 MUX 18-1 selects the second clock /region2_*pp2s* from the four clocks according to the first control signal of '1' provided by the controller 15 to apply it as the second coverage area controlling clocks reg2_*pp2s* to the second modems 19-2. The second 4×1 MUX 18-2 selects the third coverage area extending clock /region3_*pp2s* from the four clocks according to the second control signal of '2' provided by the controller 15 to apply it as the third coverage area controlling clocks reg3_*pp2s* to the third modem 19-3, and the third 4×1 MUX 18-3 selects the fourth coverage area extending clock /region4_*p2s* from the four clocks according to the third control signal of '3' provided by the controller 15 to apply it as the fourth coverage area controlling clocks reg4_*pp2s* to the fourth modem 19-4. By doing so, first to fourth GPS reference signals for respectively covering the coverage area of 60 K, 120 Km, 180 Km and 240 Km are transmitted to the first to fourth base station modems 19-1 to 19-4, respectively.

As described above, the channel card for extending the base station coverage area according to the present invention controls the GPS reference signals supplied to the base station modems to extend the coverage area by up to four times the general coverage area. Accordingly, calls can be established even at a place where installation of the base station is impossible, such as sea, or a place having a small number of users without setup of base stations. Furthermore, costs for installation of base stations can be reduced because the coverage area can be extended without set up of additional base stations. Moreover, a single channel card can be commonly used for base stations having extended coverage areas as well as general base stations so that channel card developing costs can be saved.

What is claimed is:

1. A channel card for extending the coverage area of a base station, which modulates data from a control state according to a GPS clock to transmit it to an IF modulator, and converts data sent from an IF demodulator into HDLC data to transmit it to the control station, the channel card comprising:

a controller for generating control signals for extending the coverage area of the base station;

a system clock distributor for dividing a GPS reference signal applied from a GPS clock receiver to generate a plurality of system clocks;

a coverage area extending clock generator for converting the GPS reference signal supplied from the GPS clock receiver into a plurality of signals under the control of the controller, to generate clocks for extending the coverage area;

a coverage area extending clock controller for selectively providing the plurality of coverage area extending clocks generated by the coverage area extending clock generator to first to fourth base station modems under the control of the controller; and the first to fourth base station modems which operate according to the coverage area controlling clocks provided by the extension clock controller and the system clocks generated by the system clock distributor, to handle calls established in a first area having the minimum coverage area to a fourth area having the maximum coverage area.

2. The channel card as claimed in claim 1, wherein the minimum coverage area has the radius of 60 Km and the maximum coverage area has the radius of 240 Km.

3. The channel card as claimed in claim 1, wherein the extension clock controller directly transmits a first clock among the clocks generated by the coverage area extending clock generator to the first base station modem as a first coverage area extending clock.

4. The channel card as claimed in claim 1, wherein the extension clock controller includes a first 4×1 MUS for selecting one of the coverage area extending clocks generated by the coverage area extending clock generator according to a first control signal provided by the controller to transmit it to the second base station modem as a second coverage area controlling clock, a second 4×1 MUS for selecting one of the coverage area extending clocks generated by the coverage area extending clock generator according to a second control signal provided by the controller to transmit it to the third base station modem as a third coverage area controlling clock, and a third 4×1 MUS for selecting one of the coverage area extending clocks generated by the coverage area extending clock generator according to a third control signal provided by the controller to transmit it to the fourth base station modem as a fourth coverage area controlling clock.

5. The channel card as claimed in claim 1, wherein the first, second, third and fourth base station modems handle calls established in areas having the overage areas of 60 Km, 120 Km, 180 Km and 240 Km, respectively.

6. The channel card as claimed in claim 1, wherein the first and second base station modems cover the coverage area of 60 Km and the third and fourth base station modems cover the coverage area of 120 Km under the control of the controller.

7. The channel card as claimed in claim 1, wherein the first and second base station modems handle calls established in the region having the coverage area of 60 Km, the third base station modem processes calls made in the region having the coverage area of 120 Km, and the fourth base station modem handles calls established in the region having the coverage area of 180 Km, under the control of the controller.

8. The channel card as claimed in claim 1, wherein the first base station modem handles calls established in the region having the coverage area of 60 Km, the second base station modem processes calls made in the region having the coverage area of 120 Km, the third base station modem handles calls made in the region having the coverage area of 180 Km, and the fourth base station modem processes calls established in the region having the coverage area of 240 Km, under the control of the controller.

* * * * *